(12) United States Patent
Venkataramana et al.

(10) Patent No.: US 10,604,273 B2
(45) Date of Patent: Mar. 31, 2020

(54) AIRCRAFT LIGHTING SYSTEM FOR INFORMING TRAILING AIRCRAFT

(71) Applicant: HONEYWELL INTERNATIONAL INC., Morris Plains, NJ (US)

(72) Inventors: Kiran Mancheiah Venkataramana, Karnataka (IN); Raghu Shamasundar, Karnataka (IN); Kalimulla Khan, Karnataka (IN); Srihari Jayathirtha, Karnataka (IN); Umesh Hosamani, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/048,644

(22) Filed: Jul. 30, 2018

(65) Prior Publication Data

US 2020/0031495 A1 Jan. 30, 2020

(51) Int. Cl.
*B64D 47/02* (2006.01)

(52) U.S. Cl.
CPC .................................... *B64D 47/02* (2013.01)

(58) Field of Classification Search
CPC ....................................................... B64D 47/02
USPC .................................. 340/463–468, 973–982
See application file for complete search history.

(56) References Cited

U.S. PATENT DOCUMENTS

| | | | |
|---|---|---|---|
| 8,306,677 B2 | 11/2012 | Deker et al. | |
| 9,013,331 B2 | 4/2015 | Wise | |
| 9,950,811 B2 | 4/2018 | Seibt | |
| 2003/0225492 A1* | 12/2003 | Cope | G07C 5/008 701/33.4 |
| 2011/0172914 A1 | 7/2011 | Coulmeau et al. | |
| 2012/0150368 A1 | 6/2012 | Potagnik et al. | |
| 2016/0075445 A1 | 3/2016 | Cros et al. | |
| 2016/0114901 A1 | 4/2016 | Derouineau et al. | |
| 2017/0355470 A1* | 12/2017 | Keller | F21S 41/657 |

FOREIGN PATENT DOCUMENTS

| | | |
|---|---|---|
| EP | 2076826 A2 | 7/2009 |
| WO | 02099769 A1 | 12/2002 |

* cited by examiner

*Primary Examiner* — Joseph H Field
*Assistant Examiner* — Sharmin Akhter
(74) *Attorney, Agent, or Firm* — Lorenz & Kopf, LLP

(57) ABSTRACT

Systems and methods for alerting trailing aircraft about conditions experienced by a leading aircraft are disclosed herein. The systems and methods include an aircraft lighting system, which includes at least one external aircraft light and a memory module configured to store at least one criterion associated with an aircraft parameter. The systems and methods further include a receiver module operably connected to the memory module which is configured to receive an aircraft parameter. The systems and methods also include a processor module operably connected to the memory module, the receiver module and the at least one external aircraft light, the processor being configured to compare the received aircraft parameter to the stored at least one criterion and is further configured to determine, on the basis of the comparison, whether to cause illumination of the at least one external aircraft light for observance by trailing aircraft.

10 Claims, 11 Drawing Sheets

| AUTOBRAKE SETTING | REVERSER SETTING | BRAKING CONDITION |
|---|---|---|
| MAX / 3 | IDLE | Med/Poor |
| MAX / 3 | FULL | Poor |
| MED / 2 | IDLE | Good |
| MED / 2 | FULL | Medium |
| MIN / 1 | IDLE | Good |
| MIN / 1 | FULL | Good |

FIG. 3

AIRCRAFT LIGHTING SYSTEM FOR INFORMING TRAILING AIRCRAFT

TECHNICAL FIELD

The present disclosure generally relates to the field of aircraft lighting systems. More particularly, the present disclosure relates to an aircraft lighting system via which information can be displayed to trailing aircraft.

BACKGROUND

Controlling an aircraft is a complex task, which requires decision-making on the basis of information provided to the pilot. Pilots may base decisions on information received from air traffic control (ATC), for example notices to airmen (NOTAMS) and automated terminal information service (ATIS) messages, or on information received from aircraft-to-aircraft communications such as (PIREP) reports. This received information may assist the pilot in determining, for example, the runway conditions on a runway upon which the aircraft is scheduled to land. Conventionally, when a liquid contaminant such as water, snow, slush, ice or oil is present on the runway, an aircraft which lands on the runway and experiences a reduced braking performance as a result of this liquid contaminant may transmit an informal comment to ATC to report reduced braking performance. ATC may then pass this informal comment onto other aircraft scheduled to land at that runway in order to warn the trailing aircraft's pilot of the reduced braking performance. In alternative scenarios, continuous friction measuring equipment (CFME) can be used to determine the surface friction of the runway and rank the braking action of the runway from "Good" through to "Poor". However, CFME may normally be used only in a limited number of environmental conditions, and may not be effective in certain situations where the braking conditions of a runway change over a short period of time, for example immediately following a heavy rain shower on the runway. In these quickly-changing environmental weather conditions, the reporting of informal comments made by the pilot of a leading aircraft regarding the braking conditions of the runway to trailing aircraft may be relied upon more than the CFME measurements, which have an inherent lag when providing updates on runway conditions.

In another example, pilots may use received information from ATC to ensure that a trailing aircraft maintains a minimum safe separation distance to a leading aircraft. In order to maintain a minimum safe separation distance between a leading aircraft and a trailing aircraft, the pilots of the respective aircraft and/or a ground controller must recognize instances where the minimum safe separation distance between the leading and trailing aircraft is compromised, for example when one aircraft deviates from its intended flight path due to a weather phenomenon or unexpectedly increases or decreases airspeed. In those situations where the minimum safe separation distance is compromised, ATC may provide information to the trailing aircraft so the pilot of the trailing aircraft can take preventative action to regain the minimum safe separation distance, for example by throttling down in order to regain the minimum safe separation distance.

In some scenarios, for example in high workload scenarios, it is possible that the pilot of the leading aircraft may not communicate information about certain conditions to the trailing aircraft; that ATC may not communicate the information regarding the conditions experienced by the leading aircraft to the trailing aircraft fast enough for the trailing aircraft to take effective action based on the communicated information; or that a pilot may not hear a communication broadcast by ATC.

For example, if a leading aircraft experiences reduced braking performance during a landing maneuver, the pilot of the leading aircraft may not provide any informal comment about the braking action of the aircraft to ATC. If no informal comment is communicated to the trailing aircraft by ATC, the trailing aircraft may approach the landing maneuver under the assumption that the braking conditions of the runway are better than they actually are, which could lead to the trailing aircraft experiencing hydroplaning.

It is therefore desirable to improve upon conventional methods of transmitting information from a leading aircraft to a trailing aircraft. Further advantages of exemplary will be made apparent from the following description.

BRIEF SUMMARY

This summary is provided to introduce a selection of concepts in a simplified form that are further described below in the detailed description section.

In an exemplary embodiment, there is provided an aircraft lighting system for an aircraft. The aircraft lighting system includes at least one external aircraft light. The aircraft lighting system also includes a memory module configured to store at least one criterion associated with an aircraft parameter. The aircraft lighting system also includes a receiver module operably connected to the memory module, the receiver module configured to receive an aircraft parameter. The aircraft lighting system also includes a processor operably connected to the memory module, the receiver module and the at least one external aircraft light. The processor is configured to compare the received aircraft parameter to the stored at least one criterion and is further configured to determine, on the basis of the comparison, whether to cause illumination of the at least one external aircraft light for observance by trailing aircraft.

In another exemplary embodiment, there is provided a method of transmitting information to trailing aircraft using at least one external aircraft light. The method includes the step of: receiving, using a receiver module, an aircraft parameter. The method also includes the step of comparing, using a processor module, the received aircraft parameters to at least one stored criterion. The method also includes the step of determining, using the processor module, on the basis of the comparison, whether to cause illumination of the at least one external aircraft light to thereby transmit information to trailing aircraft.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein:

FIG. 3 shows a table showing estimated braking conditions of a runway based on pre-determined combinations of autobrake settings and reverser settings in accordance with various embodiments;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. There is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines and arrows shown in the various figures contained herein are intended to represent example functional relationships and/or physical couplings between the various elements. It should be noted that many alternative or additional functional relationships or physical connections may be present in an embodiment of the present disclosure.

As used herein, the term "trailing aircraft" is used to describe an aircraft that is following a leading aircraft along the same flight route, for example as part of a stacked queue before landing at an airport or along a defined airway between two waypoints.

Figure 1:
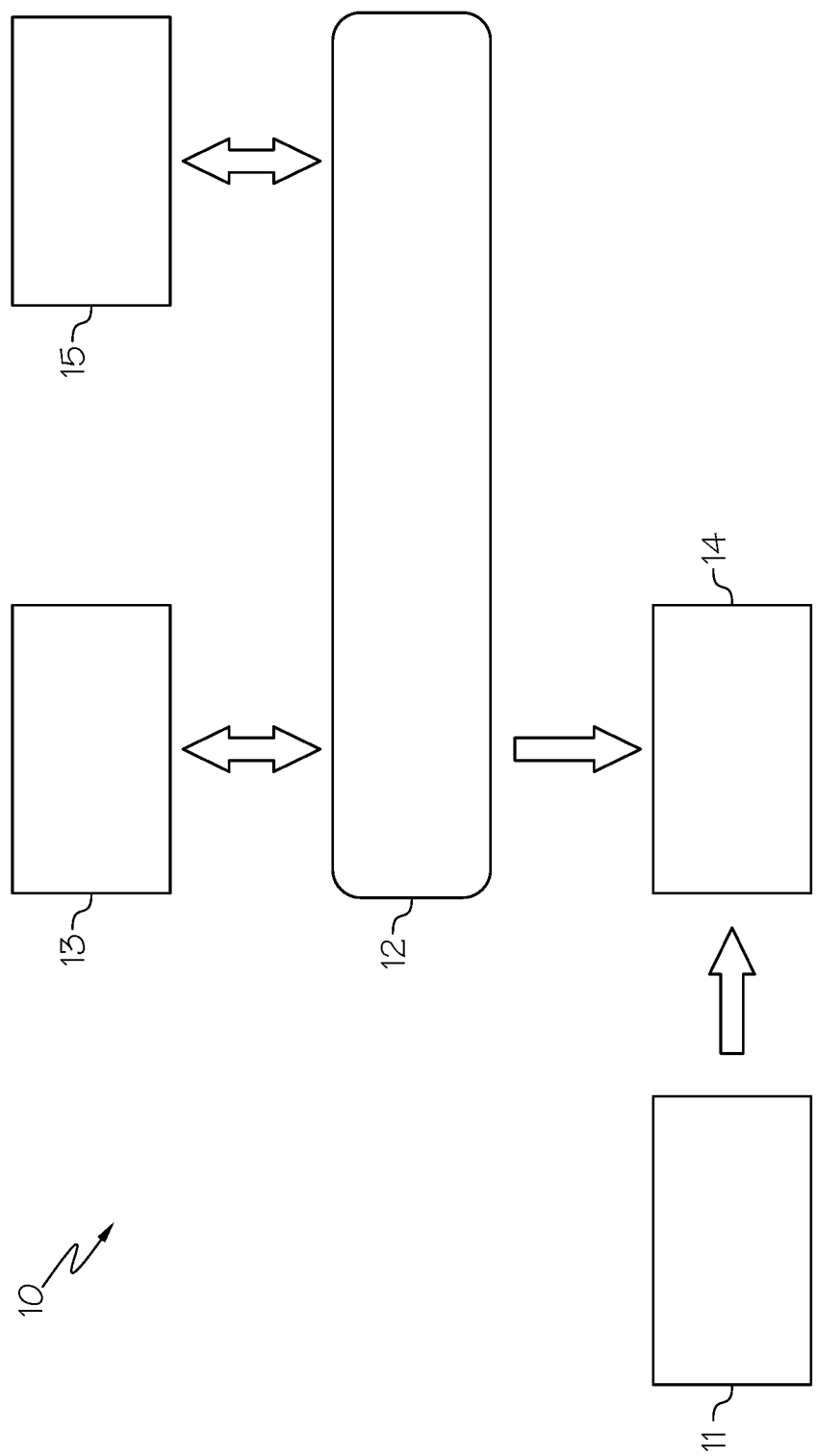
FIG. 1 shows a functional block diagram of an aircraft lighting system in accordance with various embodiments.

FIG. 1 shows a schematic of an aircraft lighting system 10 in accordance with various embodiments. Outlined arrows in this figure are used to show operable connections between the various elements shown in this figure. In exemplary embodiments, the aircraft display system 10 includes a sensor module 11. The sensor module 11 is configured to sense aircraft parameters in order to determine an aircraft state. In an exemplary embodiment, which will be explained in more detail below, the sensor module 11 is configured to detect an aircraft autobrake setting and thrust reverser setting in order to determine the braking action of an aircraft upon landing. In another exemplary embodiment, which will be explained in more detail below, the sensor module 11 is configured to sense aircraft trajectory parameters.

The aircraft lighting system 10 includes a receiver module 14. In exemplary embodiments, the receiver module 14 is configured to receive sensed aircraft parameters from the sensor module 11. In exemplary additional or alternative embodiments, the receiver module 14 is configured to receive aircraft parameters from an off-board location, for example a ground station.

The aircraft lighting system 10 further includes a memory module 13. The memory module is configured to store at least one criterion, and in some embodiments multiple criteria, for the aircraft parameters, as will be explained in more detail below.

The receiver module 14 and the memory module 13 are each operably connected to a processor module 12. The processor module 12 is configured to compare the received aircraft parameters to the at least one criterion stored in the memory module 13. In an exemplary embodiment, the processor module 12 is configured to compare received applied autobrake and reverse thrust settings to stored autobrake and reverse thrust settings. In an alternative or additional exemplary embodiment, the processor module 12 is configured to determine the conformance of the aircraft to a threshold altitude envelope defined with respect to a pre-determined reference trajectory, based on received aircraft trajectory parameters such as received altitude and airspeed parameters.

The aircraft lighting system 10 further includes at least one external light 15 operably connected to the processor module 12. When the processor module 12 compares the received aircraft parameters to the at least one criterion stored in the memory module, the processor module is configured to determine, on the basis of the comparison, whether to cause the at least one external light to signal information to trailing aircraft using the at least one external light 15, in order to quickly and efficiently communicate this information to the trailing aircraft.

Figure 2:
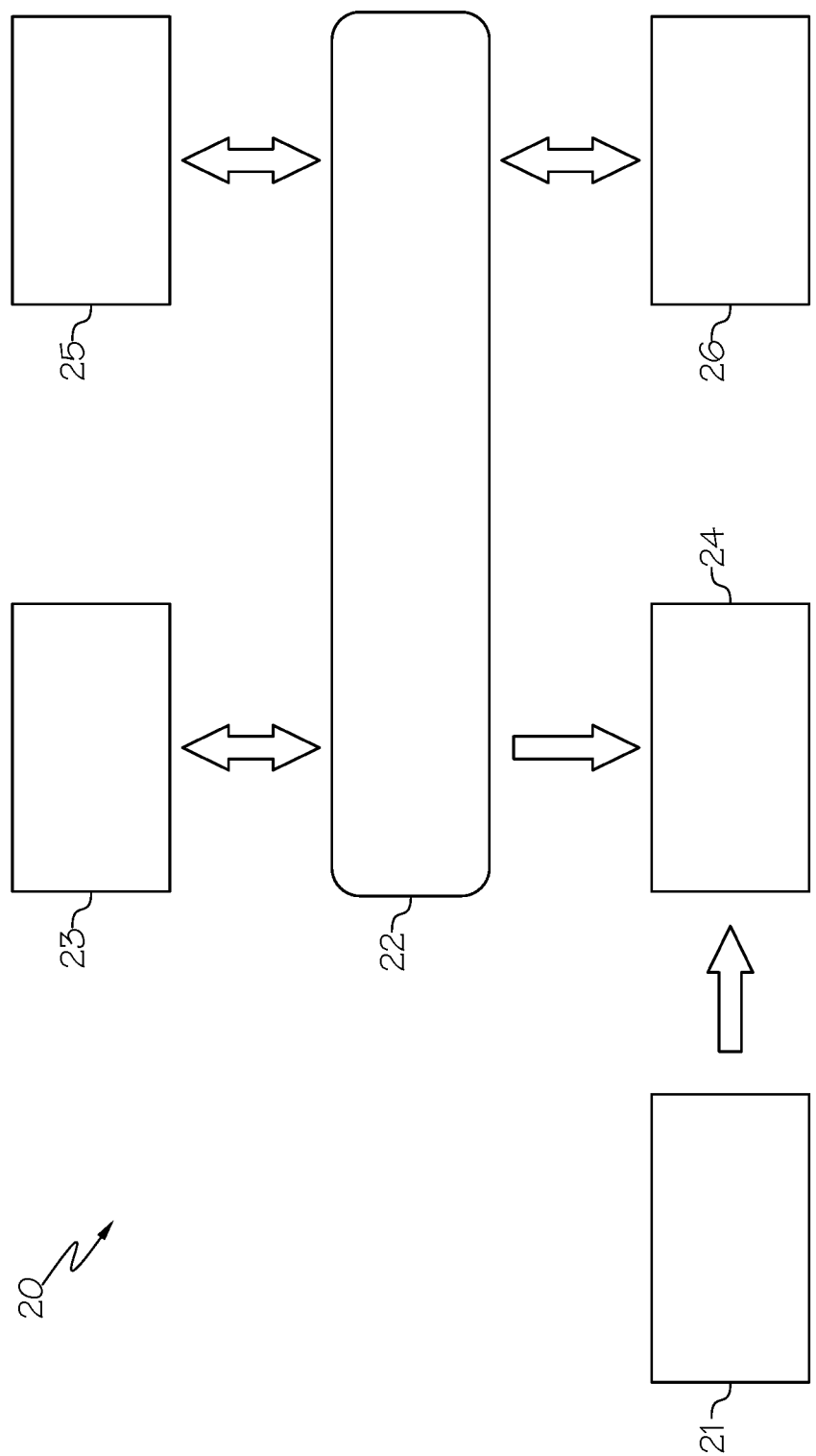
FIG. 2 shows another functional block diagram of an aircraft lighting system in accordance with various embodiments.

An exemplary aircraft lighting system 20 adapted to communicate information to a trailing aircraft about braking conditions on a runway is shown in FIG. 2. As shown in FIG. 2, the aircraft lighting system 20 includes a braking sensor module 21, which is configured to sense the autobrake setting and reverse thrust setting applied by the pilot during a landing procedure, and transmit this setting information to a receiver module 24. After receiving the autobrake setting and reverse thrust setting, the processor module 22 is configured to compare the autobrake setting and the reverser setting to a set of different combinations of autobrake settings and reverse thrust setting stored in a memory module 23, in order to determine a braking condition of the runway associated with the applied reverse thrust and autobrake settings. Also shown in FIG. 2 are at least one external light 25 and a user interface module 26, the function of which will be explained in more detail below.

An exemplary method of classifying runway braking conditions is shown in FIG. 3. The table of FIG. 3 applies to an aircraft with three autobrake settings (MIN/1; MED/2; and MAX/3), and two reverser settings (IDLE and FULL). if the MIN/1 autobrake setting is used, the braking condition of the runway can be classified as "Good", irrespective of whether the reverser setting use with this autobrake setting is idle or full. In an exemplary embodiment, the MIN/1 autobrake setting engages the brakes of the aircraft approximately 3 seconds after spoiler deployment during landing.

As can also be seen in FIG. 3, if the MED/2 autobrake setting is used, the braking condition of the runway will also be classified as "Good" if the reverser setting is set to Idle, but will be classified as "Medium" if the reverser setting is set to Full.

As can also be seen in FIG. 3, if the MAX/3 autobrake setting is used, the braking condition will be classified as "Medium to Poor" if the reverser setting is set to Idle and "Poor" if the reverser setting is set to Full.

As demonstrated above, the received autobrake and reverser settings can be used by the processor module 22 to determine the braking condition classification of the runway. After determination of the braking condition classification, the processor module 22 causes the at least one external light 25 to signal the braking condition to a trailing aircraft.

Figure 4:
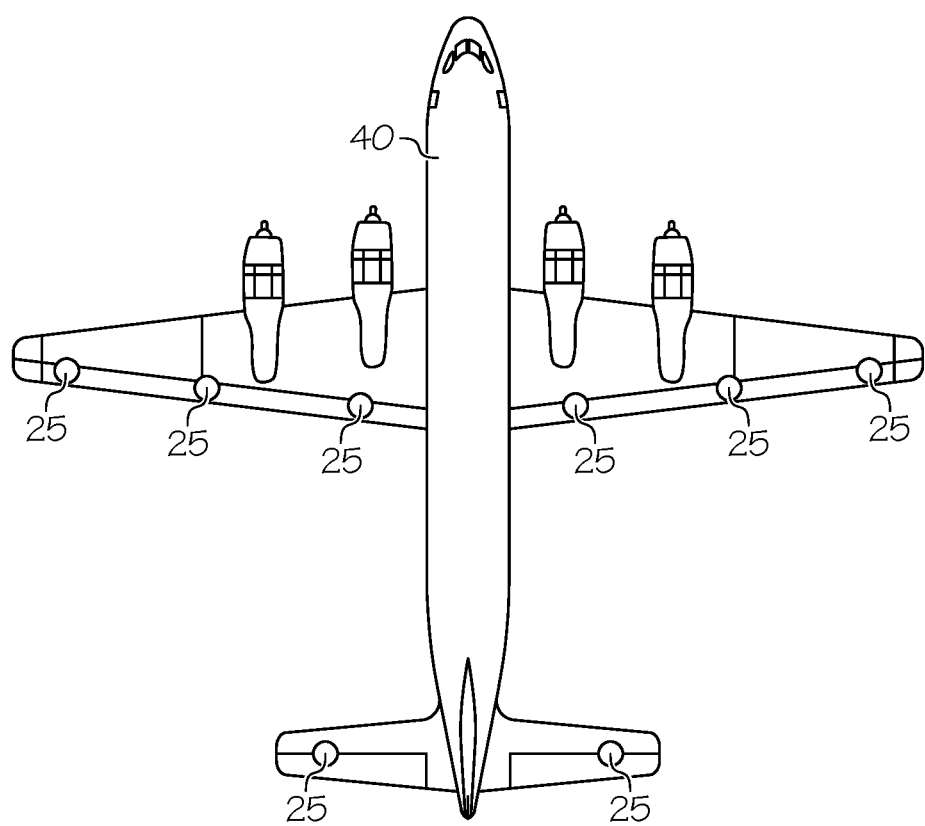
FIG. 4 shows a schematic of positions of external lights on an aircraft lighting system in accordance with various embodiments.

As shown in FIG. 4, the at least one external light 25 may comprise a plurality of external lights 25 positioned on the exterior of an aircraft 40. In an exemplary embodiment, each external light 25 is operable to emit light of different colors.

In the exemplary embodiment of FIG. 4, the braking classification may be determined by the processor module 23 to be "Good". In response to this determination, the processor module 22 is configured to cause all of the external lights 25 to output light of a particular color (for example, but not limited to, green light) to indicate to trailing aircraft that the braking condition of the runway is deemed good.

If the braking classification was determined by the processor module 22 to be "Medium", the processor module 23 is configured to cause all of the external lights 25 to output light of a different particular color (for example, but not limited to, yellow light) to indicate to trailing aircraft that the braking condition of the runway is deemed medium.

If the braking classification was determined by the processor module 22 to be "Medium to Poor", the processor module 23 is configured to cause all of the external lights 25 to output light of a different particular color (for example, but not limited to, orange light) to indicate to trailing aircraft that the braking condition of the runway is medium to poor.

If the braking classification was determined by the processor module 23 to be "Poor", the processor module 23 is configured to cause all of the external lights 24 to output light of a different particular color (for example, but not limited to, red light) to indicate to trailing aircraft that the braking condition of the runway is poor.

In an exemplary embodiment, the braking sensor module 21 may also sense additional aircraft parameters to be compared against criteria stored in the memory module 23. For example, the braking sensor module 21 may sense the aircraft's wheel speed during landing. In this exemplary embodiment, the memory module 23 stores pre-determined threshold values related to the aircraft wheel speed, which pre-determined thresholds are indicative of aircraft runway performance. In an exemplary embodiment, the pre-determined threshold value of the aircraft wheel speed is set to a value where, if the sensed aircraft wheel speed drops beneath the threshold value, it is likely that the aircraft is experiencing a hydroplaning condition, and the braking action of the runway can be classified accordingly.

In exemplary embodiments, other methods of communicating the runway braking condition experienced by the aircraft to trailing aircraft via the at least one external light 25 are used, instead of using a color-based approach. In an exemplary embodiment, the at least one external light 25 shown in FIG. 2 is configured to emit light in pulses of a certain frequency, and the frequency of the pulses may be based on the determined braking condition. For example, the processor module 22 can be configured to cause the at least one external light to pulse light at a relatively faster frequency when the braking condition of the runway is determined to be "Poor" and at a relatively slower frequency when the braking condition of the runway is determined to be "Good", to thereby communicate the braking condition of the runway to trailing aircraft in this manner. In an additional or alternative embodiment, where multiple external lights 25 are used, patterns of lights 25 can communicate the braking condition of the runway to trailing aircraft.

By communicating the determined braking condition of the runway to trailing aircraft through the use of the external lights 25 of the leading aircraft, it is possible to quickly and efficiently convey the determined braking condition of the runway to trailing aircraft without increasing the workload of the pilot of the leading aircraft, because the pilot of the leading aircraft does not need to issue an informal comment about the braking condition to ATC. Furthermore, the situational awareness of the pilot of the trailing aircraft regarding the braking condition of the runway is enhanced, and the risk of an unsuitable autobrake or reverser setting being selected by the pilot of the trailing aircraft is reduced. In particular, if the pilot of the trailing aircraft sees that the external lights of the leading aircraft is indicating that the braking condition of the runway is "Poor", but no notice has been provided by ATC or the pilot of the leading aircraft as regards to the braking condition of the runway, the pilot of the trailing aircraft may determine that is suitable to use "slippery runway" calculations and data in order to plan the landing approach, and may consequently select a higher autobrake setting to reduce the risk of an unsafe landing procedure.

In an exemplary embodiment, the aircraft lighting system 20 is configured to output infrared light of a pre-determined frequency so that infra-red cameras equipped on the trailing aircraft can detect and graphically render the external lights 25 of the leading aircraft when the external lights of the leading aircraft would otherwise be obscured to the pilot of the trailing aircraft, for example in low visibility conditions.

In an exemplary embodiment, the processor module 22 is configured to incorporate further additional sources of information into the determination of the braking condition of the runway. As shown in FIG. 2, in exemplary embodiments the processor module 22 is configured to base the determination of the braking condition of the runway also on information received at a user interface module 26 from the pilot. In exemplary embodiments, the pilot may use the user interface module 26 to manually select a braking condition of the runway based on information received from ATC, for example from received visual reports from ATC that a surface layer of water is present on the runway, or based on information received from other aircraft, such as manual notices to airmen (NOTAM) or automatic transmissions received from other aircraft or from CFME systems. In exemplary embodiments, if a user input is detected at the user interface module 26 indicating that the braking condition of the runway has a particular condition, the processor module 22 is configured to cause the at least one external light 25 to signal the indicated braking condition to trailing aircraft, independent of the selected autobrake and reverser settings.

Other types of information may also be communication via the at least one external aircraft light 10, 20. An exemplary aircraft lighting system 50 adapted to communicate information to a trailing aircraft about flight instabilities is shown in FIG. 5.

Figure 5:
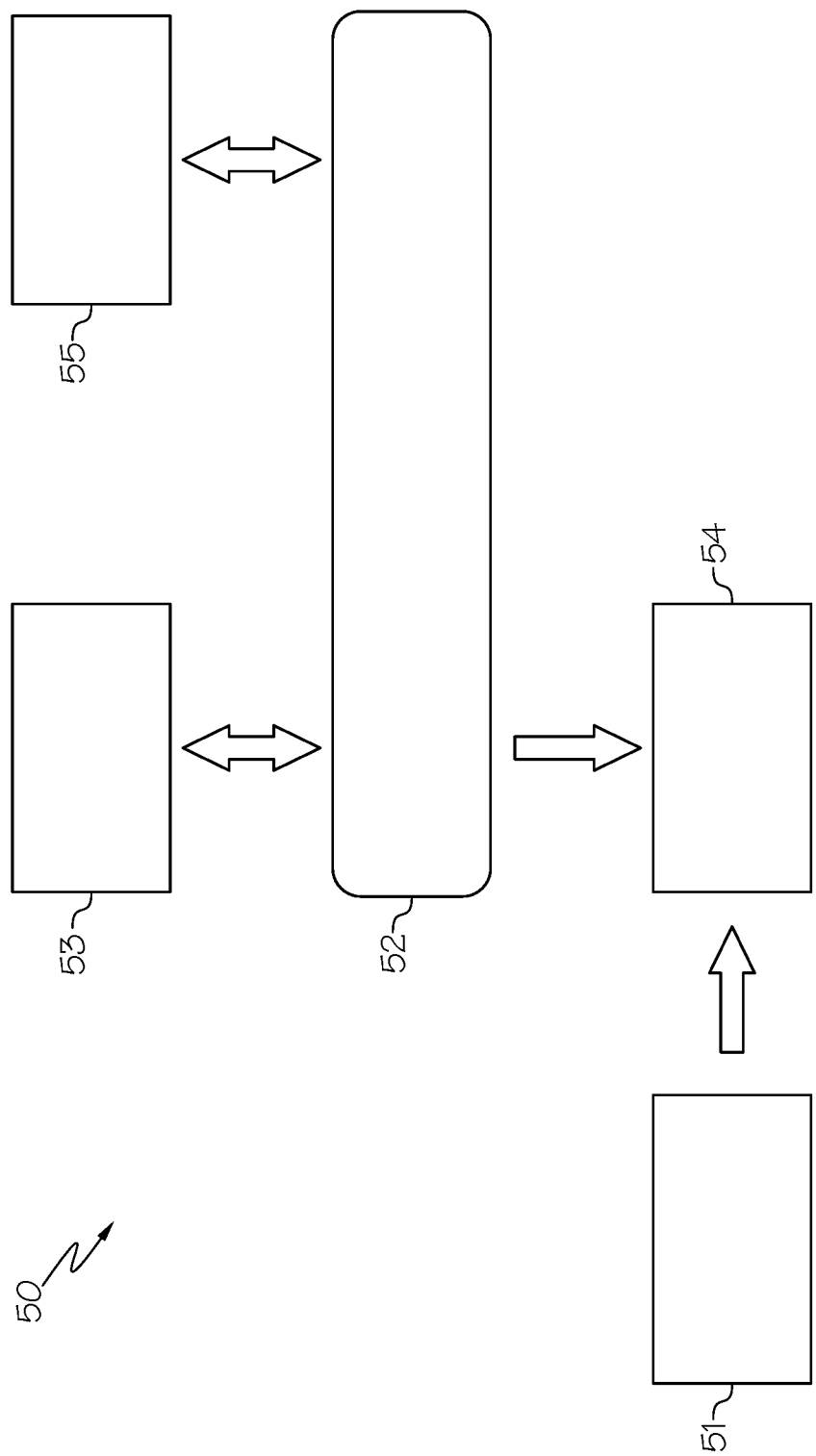
FIG. 5 shows a functional block diagram of an aircraft lighting system in accordance with various embodiments.

As can be seen in FIG. 5, the aircraft lighting system includes a location sensor module 51, which is configured to sense aircraft trajectory parameters associated with the aircraft's present trajectory. In particular, the location sensor module 51 is configured to sense aircraft parameters such as the aircraft's present location; the aircraft's present altitude; the aircraft's present track; the aircraft's present bank angle; the aircraft's present pitch angle; the aircraft's present cross track error; the aircraft's vertical deviation, the aircraft's inertial vertical speed; the aircraft's present track angle error; the aircraft's present airspeed; the windspeed surrounding the aircraft; and so on, and transmit these aircraft trajectory parameters to a receiver module 54.

The aircraft lighting system 50 further includes a memory module 53 configured to store pre-determined values related to a reference trajectory. The reference trajectory may be a predetermined "industry-standard" trajectory. For example, the reference trajectory may be a predetermined trajectory for an approach to a particular airport, the reference trajectory having upper and lower altitude limits forming an altitude envelope for the reference trajectory. In an exemplary embodiment, the threshold deviation limit is set according to industry-standard tolerance limits, such as MASP (Minimum Avionics Systems Performance) such as DO-236C and AMC 20-27, for example 50 feet above or below the reference trajectory. A processor module 52 is configured to compare received aircraft parameters associated with the aircraft's present position to the reference trajectory's altitude envelope. If the aircraft's present position is outside the altitude envelope for the reference trajectory, a divergence in altitude between the aircraft's position and the altitude envelope of the reference trajectory is detected by the processor module 52.

In order to alert trailing aircraft of the divergence in altitude between the aircraft's position and the pre-determined reference trajectory, the processor module 52 causes at least one external aircraft light 55 to signal to trailing aircraft that a threshold limit has been exceeded by the leading aircraft.

By using at least one external light 55 to signal to trailing aircraft that an altitude deviation has caused an altitude limit to be exceeded, trailing aircraft are provided with information that will allow for the pilot of the trailing aircraft to take action to minimize the risks of a similar deviation in altitude from the reference trajectory. This may be especially useful in situations where lots of aircraft are queued, for example in the approach to a busy runway, and the workload of pilots of each aircraft is increased.

Figure 6:
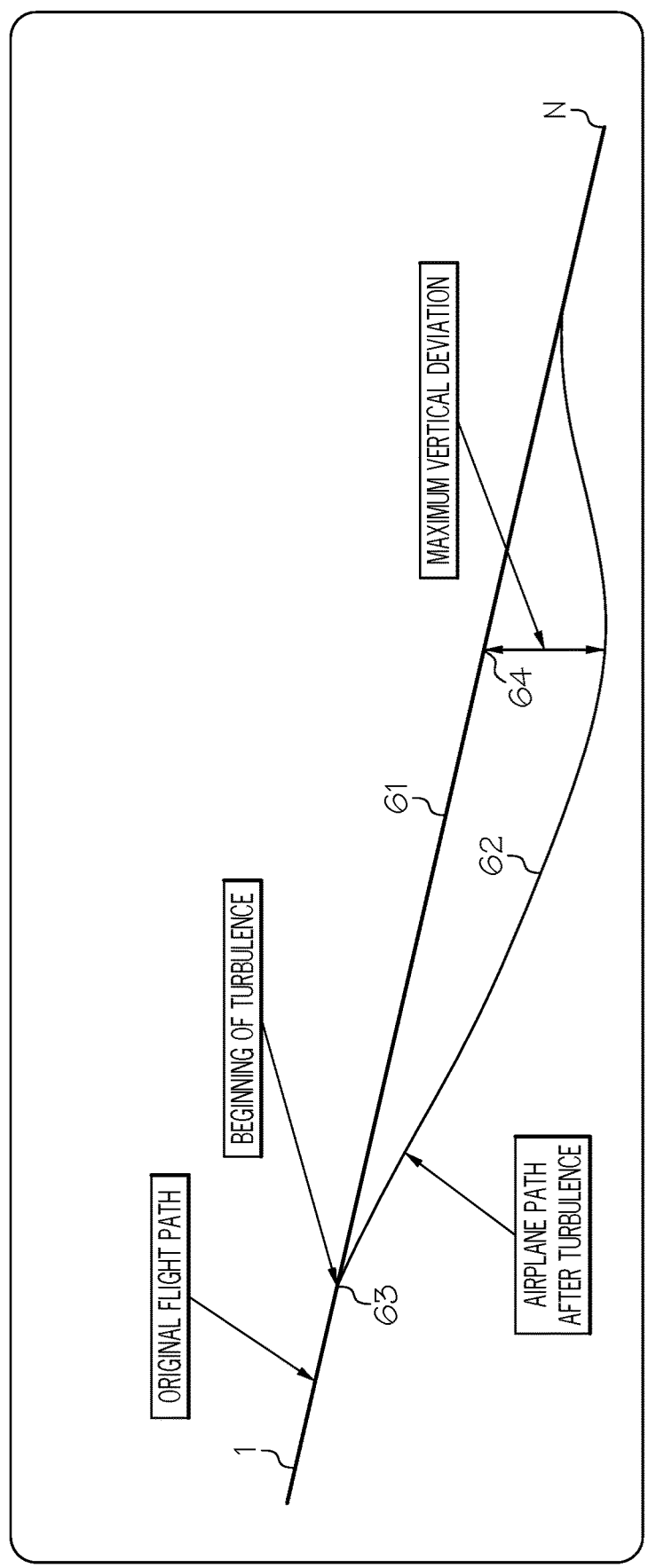
FIG. 6 shows a graph of an altitude deviation of a leading aircraft with respect to a reference trajectory.

For example, if the at least one external light 55 indicates to a trailing aircraft that the leading aircraft has experienced an altitude deviation that causes the altitude of the leading aircraft to drop below a lower threshold, as is illustrated in the scenario of FIG. 6, the pilot of the trailing aircraft may become aware that an unexpected weather phenomenon, such as turbulence, will soon be encountered that may cause a similar loss in the altitude of the trailing aircraft.

The processor module 52 is also configured to compare an Extended Projected Profile (EPP) computed by the aircraft's cockpit systems to the reference trajectory. The Extended Projected Profile (EPP) is a computed trajectory of the aircraft's projected flight, for example from the aircraft's present position to a touchdown point on the runway. The EPP may be calculated on the basis of information such as the estimated time of arrival of the aircraft at the runway; the estimated airspeed of the aircraft at the aircraft's present location; the predicted altitude of the aircraft throughout the planned flight path; the lateral distance of the aircraft to fixed points of interest/waypoints; and/or the altitude of each fixed point of interest/waypoint.

In some situations, the computed EPP may be inconsistent with the pre-determined "industry-standard" reference trajectory. For example, the EPP computed by the aircraft cockpit systems may plot a trajectory for the aircraft which would cause the aircraft to diverge from the reference trajectory.

In an exemplary embodiment, the processor module 52 is configured to compare the computed EPP to the reference trajectory in order to determine if the computed EPP will cause the aircraft to diverge from the reference trajectory at a future time. In particular, the EPP may be computed on the basis of a set of predicted aircraft values at a series of segment points from segment point 1 to segment point N, for example using values received from the sensor module 51 as part of an aircraft state matrix. The processor module 52 compares the EPP to the reference trajectory and determines if the EPP will cause a divergence of the aircraft with the reference trajectory. In an exemplary embodiment, the EPP 61 matrix and the aircraft state matrix have the following forms:

| Extended Projected Profile |
| --- |
| Segment Point 1 - Xs(x, y, z) |
| - Predicted Altitude<br>- Predicted Speed<br>- Flight Path Angle<br>- Distance<br>- Track<br>- Start Point<br>- End Point<br>- Path type (Arc, Straight)<br>- Turn Radius<br>- Turn Center<br>- Inbound Course<br>- Outbound Course<br>- Course Change |
| Segment Point 2 - Xs(x, y, z) |
| - Predicted Altitude<br>- Predicted Speed<br>- Flight Path Angle<br>- Distance<br>- Track<br>- Start Point<br>- End Point<br>- Path type (Arc, Straight)<br>- Turn Radius<br>- Turn Center<br>- Inbound Course<br>- Outbound Course<br>- Course Change<br>\|<br>\|<br>\| |
| Segment Point N - Xs(x, y, z) |
| - Predicted Altitude<br>- Predicted Speed<br>- Flight Path Angle<br>- Distance<br>- Track<br>- Start Point<br>- End Point<br>- Path type (Arc, Straight)<br>- Turn Radius<br>- Turn Center<br>- Inbound Course |

-continued

- Outbound Course
- Course Change

Aircraft State Matrix

Xa (x, y and z)
Track
Bank angle
Pitch angle
Cross Track Error
Track angle error
Vertical Deviation
Vertical Speed Error
Altitude Error rate By comparing the computed EPP to the reference trajectory to determine if the aircraft will deviate from the reference trajectory at a future time, the processor module 52 can then determine whether to cause the at least one external aircraft light 55 to signal to trailing aircraft that the threshold limit for the reference trajectory will be exceeded by the leading aircraft, based on the computed EPP of the leading aircraft.

By using at least one external light 55 to signal to trailing aircraft that an altitude limit of the leading aircraft will be exceeded, trailing aircraft are provided with information that will allow for the pilot of the trailing aircraft to take action to minimize the risks of a similar deviation in altitude. This may be especially useful in situations where lots of aircraft are queued, for example in the approach to a busy runway, and the workload of pilots of each aircraft is increased.

An exemplary reference trajectory 61 is shown in FIG. 6. As can be seen in FIG. 6, the aircraft's reference trajectory 61 between two points 1 and N is a pre-determined reference trajectory, and is shown as a representative solid black line. This reference trajectory is stored in the memory module 53.

An exemplary deviation 62 from the reference trajectory 61 is shown in FIG. 6 by means of a dashed line. In particular, the dashed line shows an altitude deviation of the trajectory of the aircraft from the reference trajectory 61, which might occur, for example, when turbulence is encountered at point 63. In particular, the aircraft may begin to experience turbulence at point 63 and subsequently begin to diverge, in terms of altitude, from the reference trajectory 61.

As shown in FIG. 6, the exemplary aircraft's altitude may continue to diverge until a point 64 of maximum vertical deviation is reached between the aircraft and the reference trajectory 61. As will be appreciated, a large divergence in altitude, such that the aircraft lies outside the maximum or minimum altitude limits of an altitude envelope defined about the reference trajectory 61 is undesirable. For example, terrain or obstacles may be present in the aircraft's flight path at lower altitudes, or undesirable weather conditions may be present at higher altitudes. In an exemplary embodiment, the maximum and minimum limits of the altitude envelope comprise an altitude of 50 feet higher than the predicted altitude at a certain segment point, and an altitude 50 feet lower than the predicted altitude at a certain segment point, respectively.

In order to alert trailing aircraft of the divergence in altitude between the aircraft's trajectory and the reference trajectory 61, the processor module 52 causes at least one external aircraft light 55 to signal to trailing aircraft that a threshold limit has been exceeded by the leading aircraft. Furthermore, in an exemplary embodiment, any inconsistencies between the reference trajectory 61 and the EPP computed by the aircraft's cockpit systems detected by the processor module 52 can also be signaled to trailing aircraft via the at least one external aircraft light.

By using at least one external light 55 to signal to trailing aircraft that an altitude deviation has caused an altitude limit to be exceeded, and/or that the EPP of the leading aircraft is inconsistent with the reference trajectory, trailing aircraft are provided with information that will allow for the pilot of the trailing aircraft to take action to minimize the risks of a similar deviation in altitude. This may be especially useful in situations where lots of aircraft are queued, for example in the approach to a busy runway, and the workload of pilots of each aircraft is increased.

For example, if the at least one external light 55 indicates to a trailing aircraft that the leading aircraft has experienced an altitude deviation that causes the altitude of the leading aircraft to drop below a lower threshold, as is illustrated in the scenario of FIG. 6, the pilot of the trailing aircraft may become aware that an unexpected weather phenomenon, such as turbulence, will soon be encountered that may cause a similar loss in the altitude of the trailing aircraft.

In an exemplary embodiment, the processor module 52 is configured to compare each segment point in the EPP to corresponding segment points on the reference trajectory in order to determine if the aircraft is predicted to soon deviate from the reference trajectory if the aircraft follows the computed EPP. Trailing aircraft can also be alerted, through the use of the at least one external light 55, if the aircraft is going to soon diverge from the reference trajectory.

Figure 7:
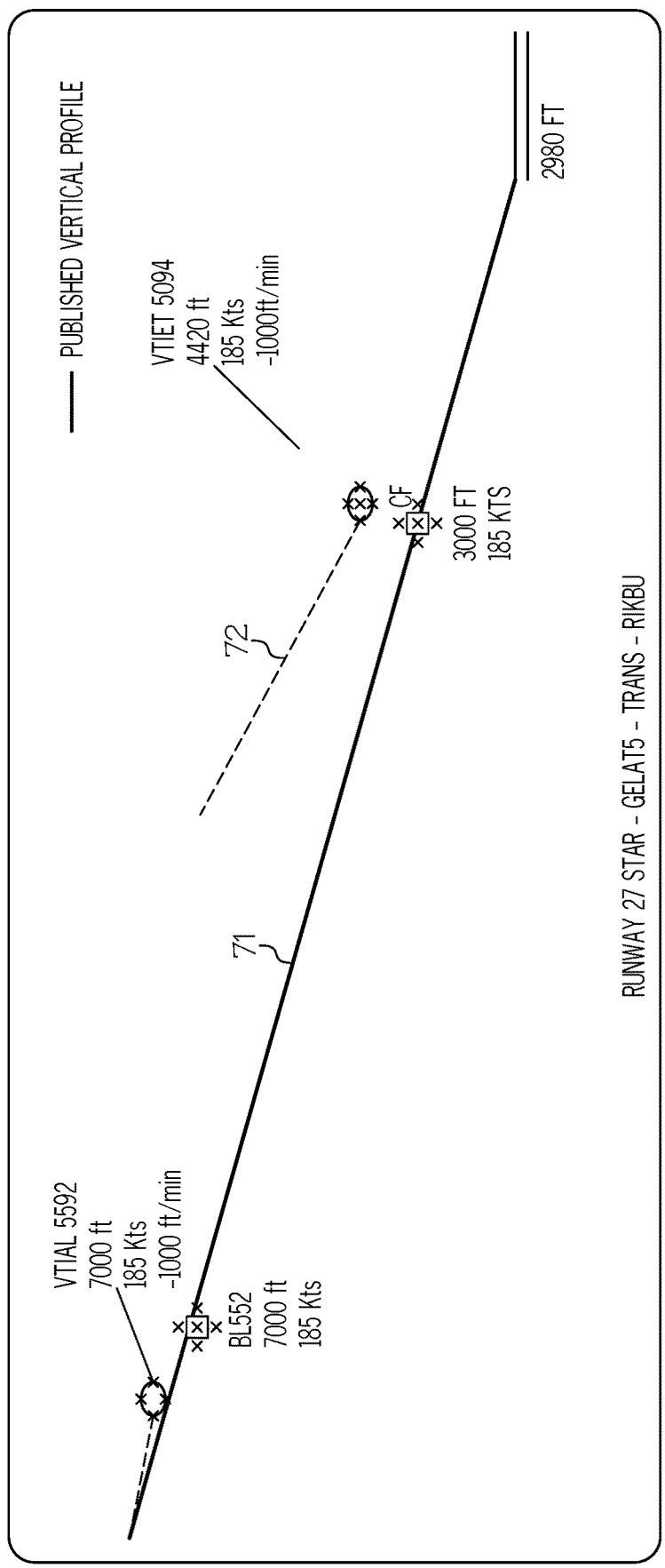
FIG. 7 shows another graph of an altitude deviation of a leading aircraft with respect to a reference trajectory.

Another exemplary altitude deviation is shown in FIG. 7. In FIG. 7, the reference trajectory 71 is shown with a solid black line. If a leading aircraft equipped with an aircraft lighting system 50 has a trajectory 72 with an altitude (shown with a dashed line) that is higher than the maximum threshold limit of an altitude envelope defined with respect to the reference trajectory 71, the processor module is configured to cause the at least one external light 55 to signal to a trailing aircraft that the leading aircraft has too high an altitude. On the basis of this signaled information from the at least one external light 55, the pilot of the trailing aircraft may make an improved decision to minimize the risk of the trailing aircraft following a similar undesirable altitude.

Figure 8:
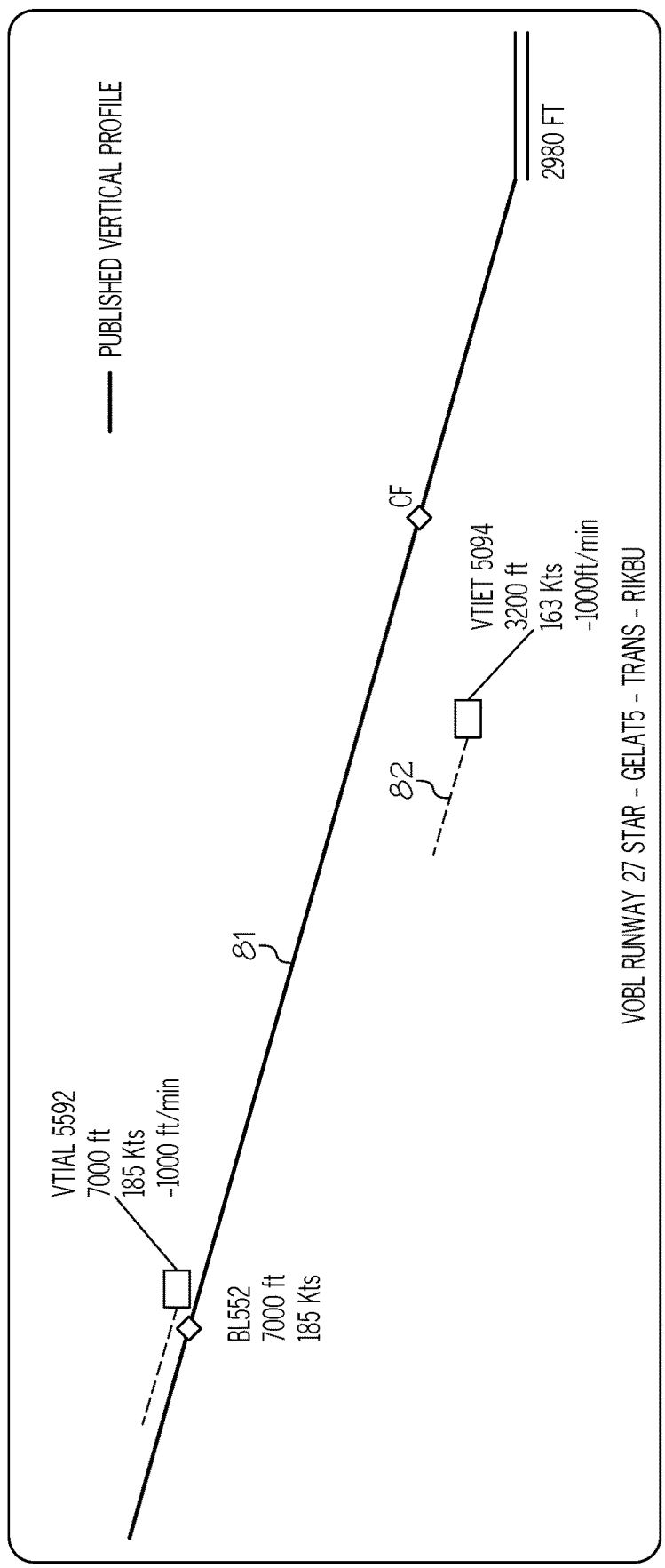
FIG. 8 shows another graph of an altitude deviation of a leading aircraft with respect to a reference trajectory.

FIG. 8 shows another exemplary altitude deviation. In FIG. 8, the leading aircraft is flying with a trajectory 82 (illustrated by a dashed line) at an altitude lower than the minimum threshold limit as defined to the reference trajectory of the reference trajectory 81 due to pilot error.

As a result of this low altitude, the processor module 52 of the aircraft lighting system 50 of the leading aircraft causes the at least one external light 55 to indicate to a trailing aircraft that the leading aircraft is flying at a too-low altitude, which altitude may be a violation of airspace containment rules. As such, the pilot of the trailing aircraft is able to, on the basis of the signaled information, take action to minimize the risk that the trailing aircraft also flies at the same too-low altitude.

It will be appreciated that, whilst the two above-described embodiments relate to runway braking conditions and altitude envelopes defined with respect to a reference trajectory, other types of sensed aircraft parameters may be compared with stored information and this comparison could be used to signal information to trailing aircraft using at least one external light. For example, airspeed violations, airspace violations, aircraft banking angle violations and so on, could also be signaled to trailing aircraft through the use of at least one external light. By indicating airspeed violations to pilots of trailing aircraft, the situational awareness of the pilot of the trailing aircraft is increased with respect to potential violations of minimum safe separation distance, and the time taken for the pilot of the trailing aircraft to take a corrective action is reduced.

Figure 9:
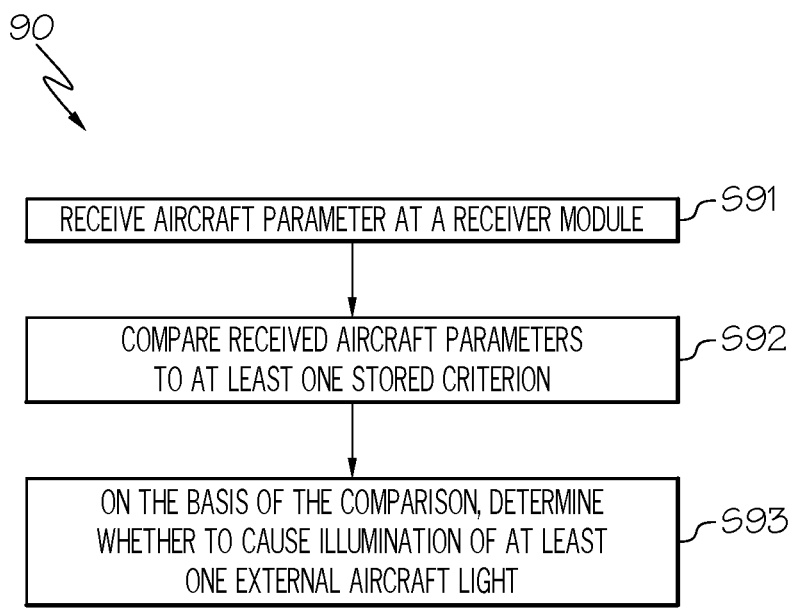
FIG. 9 shows a flowchart of a method in accordance with various embodiments.

An flowchart illustrating an exemplary method 90 according to various embodiments is shown in FIG. 9.

At step S91 of FIG. 9, one or more aircraft parameters are received using a receiver module. In various exemplary embodiments, the aircraft parameters relate to selected autobrake and reverser settings; to aircraft trajectory information such as aircraft altitude and airspeed information; and so on. In an exemplary embodiment, the aircraft parameters are sensed using a sensing module mounted on the aircraft and then transmitted to the receiver module. In an additional or alternative embodiment, the aircraft parameters are received from an off-board location. After receipt of the aircraft parameters, the method progresses to step S92.

At step S92, the received aircraft parameters are compared, using a processor module, to at least one criterion associated with the aircraft parameters stored in a memory module.

At step S93, a determination is made using the processor module whether to, on the basis of the comparison, cause illumination of at least one external aircraft light to thereby transmit information to trailing aircraft. In an exemplary embodiment, the illumination of the at least one external aircraft light indicates to tailing aircraft that an altitude envelope limit has been exceeded or will soon be exceeded. In an exemplary embodiment, the illumination of the at least one external aircraft light provides information regarding the braking condition of a runway to trailing aircraft.

Figure 10:
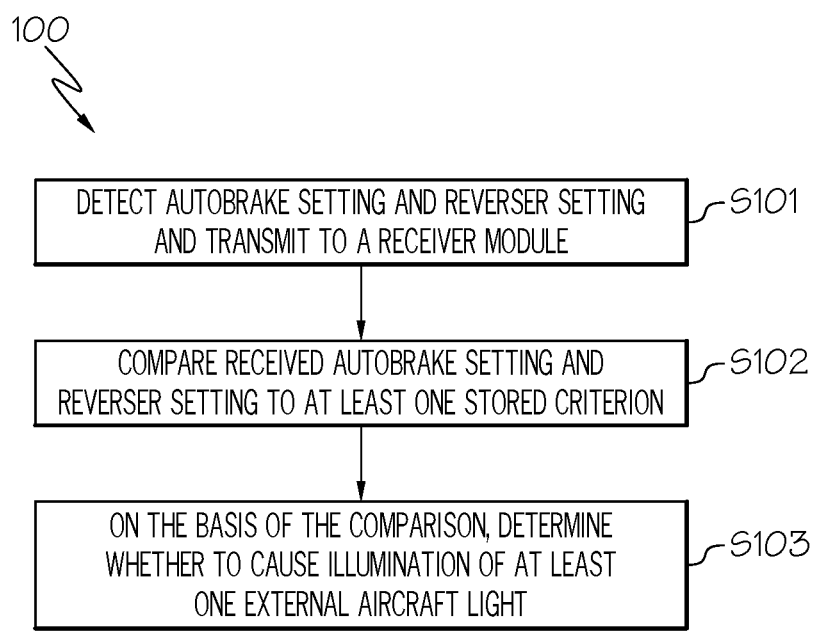
FIG. 10 shows another flowchart of a method in accordance with various embodiments.

Another flowchart showing an exemplary method 100 according to an embodiment is shown in FIG. 10. In the exemplary method of FIG. 10, an external aircraft light is used to transmit information regarding a runway braking condition to a trailing aircraft.

At step S101 of FIG. 10, aircraft parameters including aircraft autobrake settings and reverser settings are detected using a sensor module and transmitted to a receiver module. Additionally, other aircraft parameters may optionally also be sensed by the sensor module, for example aircraft wheel speed. After sensing the aircraft autobrake settings, the reverser settings, and optionally further aircraft settings, these sensed aircraft parameters are transmitted to a receiver module and the method progresses to step S102.

At Step S102, the received aircraft parameters are compared, using a processor module, to at least one criterion associated with the aircraft parameters stored in a memory module. In particular, the at least one predetermined criterion includes a predetermined selection of certain autobrake and reverser settings. After the comparison of the received aircraft parameters to the at least one predetermined criterion, the method progresses to Step S103.

At step S103, the processor module is configured to determine, on the basis of the comparison, the braking condition of the runway. The processor module is then configured to cause illumination of at least one external light of the aircraft in a manner corresponding to the braking condition of the runway. In an exemplary embodiment, the processor module is configured to cause the at least one external light to emit green light in response to a determination that the braking condition of the runway is "Good"; to emit yellow light in response to a determination that the braking condition of the runway is "Medium"; to emit orange light in response to a determination that the braking condition of the runway is "Medium-to-Poor"; and to emit red light in response to a determination that the braking condition of the runway is "Poor". The categories "Good"; "Medium"; "Medium-to-Poor" and "Poor" are pre-determined categories corresponding to the selection of particular settings of the autobrake and the reverser.

Figure 11:
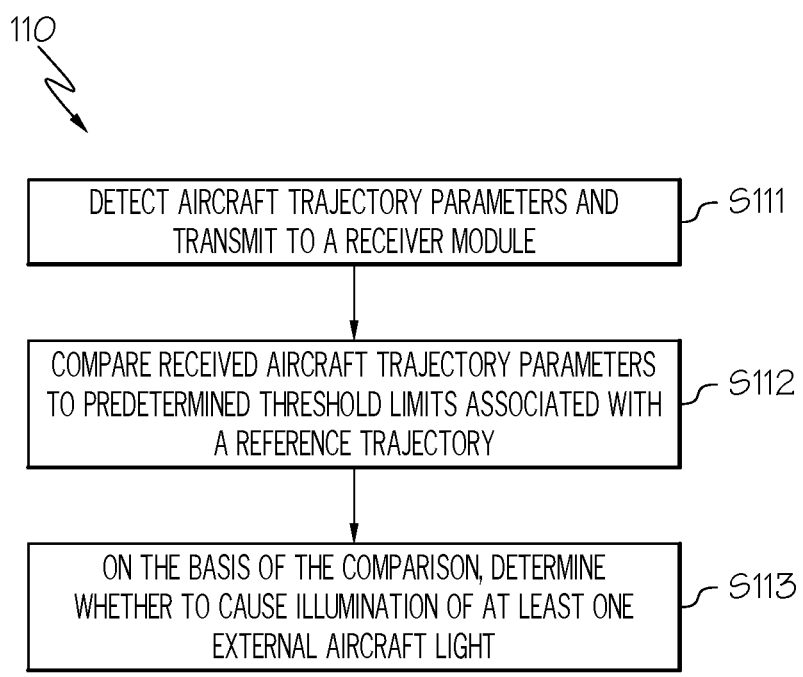
FIG. 11 shows another flowchart of a method in accordance with various embodiments.

Another flowchart showing an exemplary method 110 according to an embodiment is shown in FIG. 11. At step S111 of the exemplary method of FIG. 11, aircraft trajectory parameters, including aircraft location and aircraft altitude, are received at a receiver module. After receiving the aircraft trajectory parameters at the receiver module, the method progresses to step S112.

At step S112, the received aircraft trajectory parameters are compared, using a processor module, to pre-determined threshold limits. In particular, the received aircraft trajectory parameters are compared to pre-determined threshold limits defined with respect to a pre-determined reference trajectory. If the received aircraft trajectory parameters are within the pre-determined threshold limits, the method reverts to step S111. If the received aircraft trajectory parameters are not within the pre-determined threshold limits, the method then proceeds to step S113.

At step S113, at least one external light is caused, by the processor module, to signal to trailing aircraft that the aircraft has deviated from the reference trajectory. In an exemplary embodiment, details of the deviation, such as time of occurrence and the amount by which the pre-determined threshold limits were exceeded are stored in a memory module.

In an optional additional step, the processor module additionally compares a computed Extended Path Profile (EPP), computed by cockpit systems of the aircraft, to the pre-determined reference trajectory in order to determine whether there is a divergence between the computed extended path profile and the pre-determined reference trajectory. The processor module determines, on the basis of this additional comparison, whether to cause illumination of the at least one external aircraft light to thereby transmit information to trailing aircraft that the leading aircraft will diverge, at a future time, from the pre-determined reference trajectory.

In an exemplary embodiment, the processor module determines that there is a divergence between the computed extended path profile and the pre-determined reference trajectory if any point on the computed extended path profile of the aircraft lies outside a threshold altitude deviation limit defined with respect to the pre-determined reference trajectory.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. An aircraft lighting system for an aircraft, comprising:
 at least one external aircraft light;
 a memory module configured to store at least one criterion associated with an aircraft parameter;

a receiver module operably connected to the memory module, the receiver module configured to receive an aircraft parameter; and a processor module operably connected to the memory module, the receiver module and the at least one external aircraft light, the processor being configured to compare the received aircraft parameter to the stored at least one criterion and is further configured to determine, on the basis of the comparison, whether to cause illumination of the at least one external aircraft light for observance by trailing aircraft, wherein the received aircraft parameter comprises an autobrake setting and a thrust reverser setting.

2. The aircraft lighting system of claim 1, wherein the stored at least one criterion comprises pre-determined combinations of autobrake settings and thrust reverser settings.

3. The aircraft lighting system of claim 1, wherein the processor module is further configured to select, on the basis of the comparison, a type of illumination of the at least one external aircraft light from a set of different types of illumination of the at least one external aircraft light.

4. The aircraft lighting system of claim 3, wherein the set of different types of illumination comprises different colors of light illumination.

5. The aircraft lighting system of claim 1, further comprising a sensor module configured to sense the aircraft parameter and transmit the aircraft parameter to the receiver module.

6. A method of transmitting information to trailing aircraft using at least one external aircraft light, comprising:

receiving, using a receiver module, an aircraft parameter;

comparing, using a processor module, the received aircraft parameters to at least one stored criterion; and determining, using the processor module, on the basis of the comparison, whether to cause illumination of the at least one external aircraft light to thereby transmit information to trailing aircraft, wherein the aircraft parameter comprises an autobrake setting and a thrust reverser setting.

7. The method of claim 6, wherein the at least one stored criterion comprises pre-determined combinations of autobrake settings and thrust reverser settings.

8. The method of claim 6, further comprising the step of selecting, using the processor module, on the basis of the comparison, a type of illumination of the at least one external aircraft light from a set of different types of illumination of the at least one external aircraft light.

9. The method of claim 8, wherein the set of different types of illumination comprises different colors of light illumination.

10. The method of claim 6, further comprising sensing, using a sensor module, the aircraft parameter and transmitting the sensed aircraft parameter to the receiver module.

* * * * *